(12) United States Patent
Ferone

(10) Patent No.: US 8,317,176 B2
(45) Date of Patent: Nov. 27, 2012

(54) MAGNETIC CUTTING BOARD

(76) Inventor: Ralph J. Ferone, Seattle, WA (US)

(*) Notice: Subject to any disclaimer, the term of this patent is extended or adjusted under 35 U.S.C. 154(b) by 564 days.

(21) Appl. No.: 12/460,815

(22) Filed: Jul. 25, 2009

(65) Prior Publication Data

US 2010/0019430 A1    Jan. 28, 2010

Related U.S. Application Data

(60) Provisional application No. 61/135,954, filed on Jul. 25, 2008.

(51) Int. Cl.
*B23Q 3/00*    (2006.01)

(52) U.S. Cl. .................. 269/289 R; 269/302.1

(58) Field of Classification Search ............. 269/289 R, 269/302.1
See application file for complete search history.

(56) References Cited

U.S. PATENT DOCUMENTS

| | | | |
|---|---|---|---|
| 6,045,319 A * | 4/2000 | Uchida et al. | 414/676 |
| 6,305,653 B1 * | 10/2001 | Oldham et al. | 248/177.1 |
| 7,125,011 B2 * | 10/2006 | McLaughlin | 269/289 R |
| 7,637,488 B2 * | 12/2009 | Zeng | 269/302.1 |
| 7,959,141 B2 * | 6/2011 | Makino | 269/58 |
| 2009/0218741 A1 * | 9/2009 | Winnard | 269/8 |
| 2010/0019430 A1 * | 1/2010 | Ferone | 269/289 R |

FOREIGN PATENT DOCUMENTS

| | | |
|---|---|---|
| GB | 2311460 | 9/1999 |
| GB | 2389513 A | 12/2003 |

* cited by examiner

*Primary Examiner* — Lee D Wilson

(57) ABSTRACT

A cutting board comprising a base and a working board held together by magnets, aligning pins, or fingers on the base gripping the working cutting board. The base has cut-outs so that a plate, tray, or shallow bowl can be slid under the board permitting the cuttings to be slid off the board into the bowl without having to lift the board, likely tilting it and spilling the cuttings and/or juices or dumping separated portions of the cut food.

9 Claims, 2 Drawing Sheets

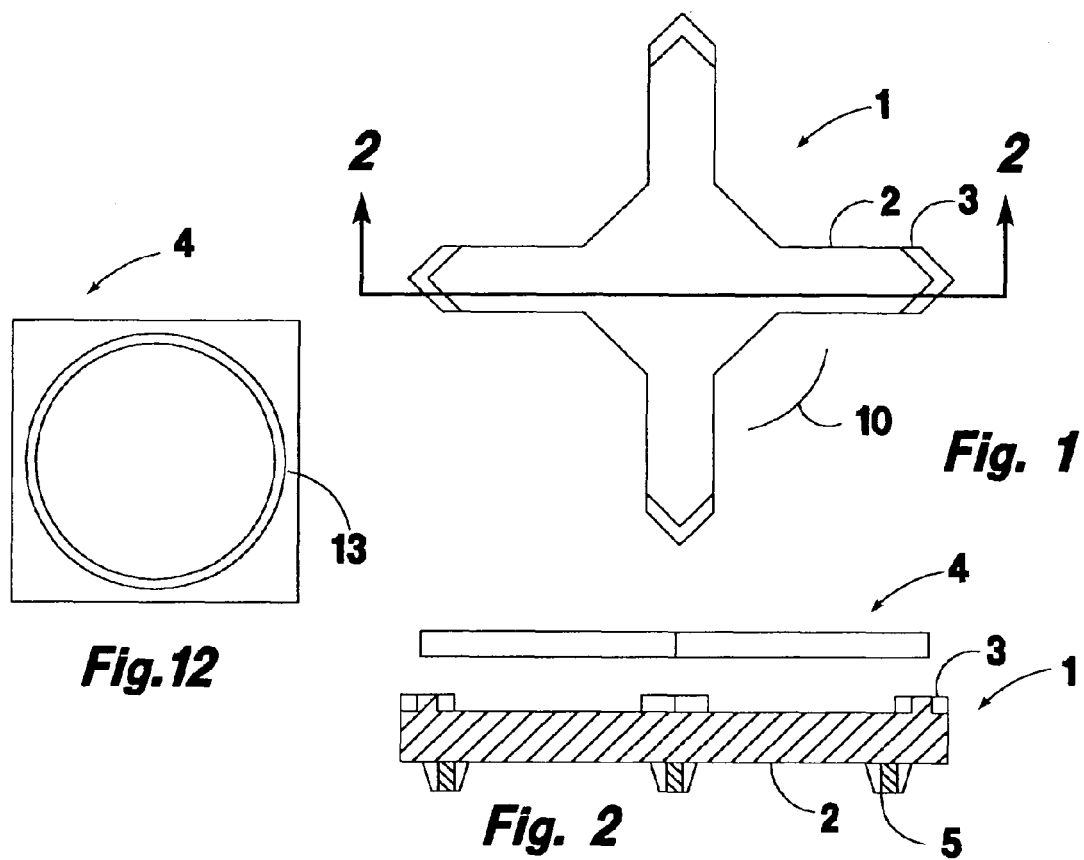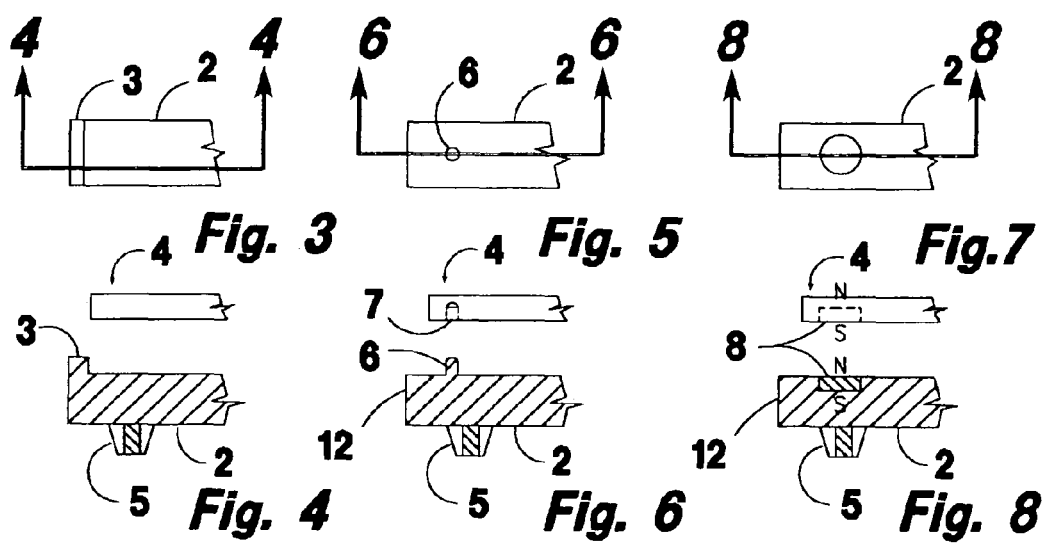

MAGNETIC CUTTING BOARD

CROSS REFERENCES TO RELATED APPLICATIONS

The present application claims benefit of filing date of co-pending Provisional Application Titled Dual Cutting Board Station.

Provisional Application No. 61/135,954;
Filed on Jul. 25, 2008.

The above-described provisional application in its entirety is incorporated herein by reference.

U.S. GOVERNMENT INTEREST IN THE INVENTION

None

BACKGROUND OF THE INVENTION

1. Field of Invention
Kitchen equipment, food cutting boards
2. Description of Prior Art The common cutting board used for food preparation is a single flat plate of wood or plastic and is set directly on the kitchen counter top or preparation table, and are prone to sliding during use; picking up contamination from food, water, and cleaning residue on the counter top, or depositing similar onto the counter top; possibly scratching the counter top; rocking if the board or counter top is warped or not flat; difficulty in picking up because of it being directly on the counter top; etc. Moreover, when it is time to move the cuttings to a serving or mixing bowl, the board must be lifted and/or carried to the receiving vessel. While it is being so moved, there being no retaining lips, spillage is common, especially if the cut-up material is juicy. Care must be taken to ensure that there is no cross contamination of the foods prepared on a board, especially between meat products and vegetables, and between beef and poultry. Health authorities recommend separate boards for each category of foods. Wooden boards are particularly prone to cross contamination as they have a propensity to soak up juices and are difficult to clean thoroughly and deeply. Plastics such as polypropylene, polyethylene, Nylon, Teflon, ABS, and the like are used in the trade. High-density wood fiber laminates have been found to have the desired characteristics. Plastic boards nick and score easily, and when scored, the furrow is edged with a raised burr. Users criticize plastic as tending to dull knives. Both plastic and wood can be resurfaced a few times reasonably well by sanding, filing, scraping or a combination of these simple procedures. Plastic boards, unlike wood, are generally resistant to bleaches and other strong disinfectant chemicals and may be put into the dishwasher for washing.

U.S. Pat. No. 7,125,011, Oct. 24, 2006 by Kevin McLaughlin in one mode is a set of relatively thin and flexible plastic sheets bonded to together by sheet magnets. The sheets are separated for use as individual boards each dedicated to compatible foods. Another mode of cutting board design taught by McLaughlin is a more rigid board with magnets at the corners on one side (4:9-25). McLaughlin teaches only that the magnets are for stacking boards and for adhering to a refrigerator for storage. No base for his cutting board is mentioned. One problem with having a magnetic underside or spot magnets mounted on the underside is that the magnets may pick up ferrous particles. Not common, but may be on the counter top from several sources, in particular, from sharpening steel knives over the counter top. The particles will accumulate on the magnets and surely will mar the counter top as the board slides about in use.

GB2311460, by Nigel Bruce Hinton shows a one-piece board system comprising a cutting surface attached to a base. The board portion is larger than the base and the overhang is used to slide rectangular trays or plates to receive the cuttings from the cutting board. Furthermore, the base portion has at least one arcuate cut-out to receive rounded plates or trays for receiving cuttings.

Joseph-Joseph Ltd. dual magnetic cutting board, Patent application GB 0526482.5 (abandoned) wwwjosephjoseph-.com. Anthony Joseph and Richard Joseph The Joseph-Joseph board is a rectangular plastic working plate and a solid rectangular wooden base system. Both have magnets, arranged N-S to attract, embedded flush in the corners of both the base and cutting plate. The cutting board is held securely to the base solely by magnetic attraction.

None of these address all the objections identified above.

To overcome the problems of sliding, off-loading, and cleaning, a board or boards with a base having friction feet and removable working boards is described as the solution to all the identified problems of the usual cutting board operation.

OBJECTS OF THE INVENTION

It is an object of the invention is to provide a base with friction feet to inhibit sliding.

Another object of the invention is to provide a base with recesses for sliding a plate, tray, or shallow bowl under the board so that the cuttings may be swept into the bowl.

Another object of the invention is to use a common base adapted to receive any of several interchangeable cutting boards.

Another object of the invention is to permit the cutting boards to be removed and cleaned separately from the base.

SUMMARY OF THE INVENTION

Two models are described. Both have a mounting base with non-skid feet and a removable cutting surface of plastic or wood. In use, the cutting board part and the base part form a firm one-piece structure easily separated for cleaning or swapping boards dedicated to different food groups. The base structure is either a wood or plastic plate generally shaped like the cutting board, but having cut-outs to receive a plate or tray under the cutting surface so that the cut-up food may be swept onto the receiving plate without having to lift either the food or the board. An alternative base structure is formed in the general shape of a four legged X, although 3, 5 or more legs may be used. The bottom sides of the legs, like the full size bases, are equipped with feet to prevent sliding on a kitchen counter top.

The cutting board and base are joinable by several methods. The first group is mechanical uses edge capture, pins, bosses, etc. and a second group uses cooperating magnets to provide holding forces. Both groups hold the cutting board and base in fixed relationships and can be disassembled with a minimum of skill and effort.

The mechanically fastened board system uses bosses at the corners of the base to form edges to prevent the cutting board from sliding off the base. The preferred shape of the base is an X shape with the space between the X legs comprising a space for receiving a plate, tray, or shallow bowl waiting for the cuttings to be swept onto the plate or tray the same as for the magnetic version.

The X base may have a square outline as illustrated, for receiving a square or circular cutting board, or the base may be elongated to receive a rectangular, oval, custom, whimsical, or novelty shaped board.

The magnetically fastened board system uses permanent magnets in the base and cutting board to hold the cutting board to the base. As many magnets as needed are used, generally four or six embedded flush in both the cutting board and the base. The magnet positions and polarization's (N-S) are arranged cooperatively. The pattern of the magnets is symmetrical so that for square, rectangular, or round cutting boards, the board may be magnetically attached to the base in any of several equivalent positions.

By having the magnets sized to be flush with both sides of the cutting board, the board may be reversible for use on both sides. Note, however, that the set of magnets has to have the symmetry altered so that the N-S relationships can be maintained in both the regular and inverted position.

BRIEF DESCRIPTION OF THE FIGURES

FIG. 1 is a plan view of a base for a rectangular cutting board with the retaining fingers adapted to hold the cutting board by the corners.

FIG. 2 is a cut-away side view of the base of FIG. 1 and also showing an edge view of the cutting board ready for insertion into the retaining fingers at the base edges.

FIG. 3 is a partial plan view showing an alternative arrangement of the retaining fingers adapted to hold the cutting board by the side edges.

FIG. 4 is a partial cut-away elevation view of the retaining fingers adapted to hold the cutting board by the side edges.

FIG. 5 is a partial plan view showing pins to hold the cutting board.

FIG. 6 is a partial cut-away elevation view of the base and also showing an edge view of the cutting board ready for insertion onto the retaining pins.

FIG. 7 is a partial plan view showing magnets to hold the cutting board to the base.

FIG. 8 is a cut-away view of the base of FIG. 5 and also showing an edge view of the cutting board ready for insertion onto the magnets near the base edges.

FIG. 12 is a view of the underside of a cutting board having a circular groove for cooperative engagement with the securing pins of the base illustrated in FIGS. 5 and 6.

TABLE OF IDENTIFIED DETAILS

Figure 9:
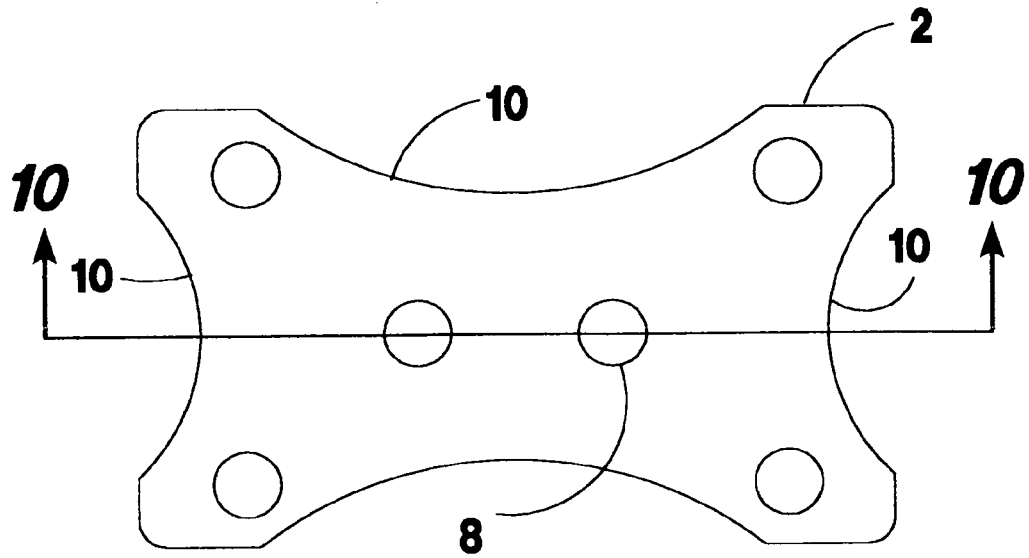
FIG. 9 is a plan view of a larger rectangular base using magnets for retaining the cutting board.
Figure 10:
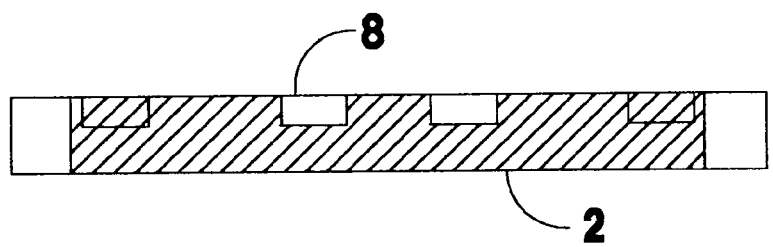
FIG. 10 is a cut-away elevation view of the base shown in FIG. 9.
Figure 11:
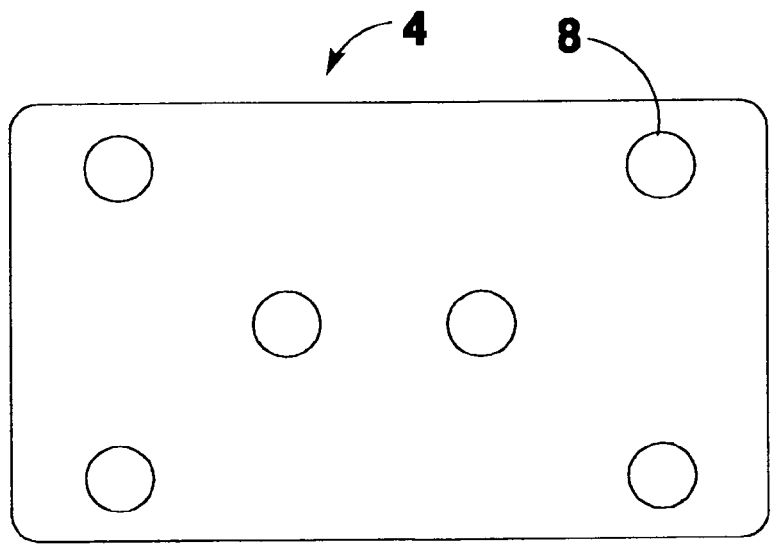
FIG. 11 is a view of the underside of the cutting board for use with the base of FIG. 9, showing the retaining magnets.

1. The base assembly
2. Arms extending to the edges of the cutting board.
3. Walls extending upward to retain the cutting board.
4. The cutting board portion of the system
5. Skid resistant feet.
6. Pin, post, or boss retaining means.
7. Cooperating hole to receive pin.
8. Magnet. Magnetic retaining means.
9. Not used
10. Recess to receive a plate, tray, or shallow bowl.
11. Not used.
12. Base arm extension as a handle for forcing the board and base apart.
13. Continuous groove for receiving a set of base pins.

DETAILED DESCRIPTION OF THE INVENTION

Referring to FIGS. 1, 2, 3, and 6, the base assembly 1 shown in FIG. 1 shows the application of walls or raised fingers 3 at the outer edges of the base, where the walls 3 extend upwardly from the base 2 and form a cup-like holder for receiving the cutting plate 4. Base 2 is fitted with any of a variety of skid resistant feet. Typical rubber or plastic cones 5 are illustrated in the figures. The feet also reduce the transmission of noise and vibrations to the counter top. This is particularly important when the board is used under a chopping motion of the knife.

FIG. 2 is of the base, of FIG. 1, showing details of corner retaining fingers, and the cutting board portion 4 is shown ready to be set into the base for use.

FIGS. 3, 4, 5, 6, 7, and 8 illustrate variations of the retaining means.

FIGS. 3 and 4 show the walls adapted to retain a board by the side edges instead of the corners. This option is particularly pertinent to rounded boards such as circular disks, ovals, or other patterns with generally curved edges. Walls 3 may be curved to match a curve edged board, or left straight.

FIGS. 5 and 6 show a pin 6 and cooperating hole 7 to hold the cutting board to the base. The pins should be rounded at the top, and the holes should be rounded at the bottom Rounding of the holes is to make for easier cleaning of food, soap, or other things that might lodge in the bottom of the holes, particularly in any corners. The holes may be replaced by a cooperating groove, which would permit the board to be set on the pins in a larger number of positions. The groove is superior to holes in that it is much easier to align the pins with a groove than it is to align them with a small target like the holes. Like the holes, the groove should have a rounded bottom for ease of cleaning. A groove is particularly useful with circular cutting boards. The pins may be any shape such as rectangular, polygonal, conical, pyramidal, portions of a sphere or ovoid, etc.

Turn the cutting board over, groove up, and the groove makes a handy collector for juice from things like tomatoes and meats.

FIGS. 7 and 8 show the use of magnets to 8 to hold the cutting board and base together. The magnets are embedded flush with the surfaces of the base and cutting board, and aligned N-S—N-S so they attract. If more force is required, additional magnets may be put on the arms of the X or in the center block. Magnets are available with both N and S poles exposed, which together should provide more holding force for similar sized magnets. Pole pieces in the form of a cup with the magnet in the center will also shorten the path of the lines and increase the holding power.

If the magnets are made larger so as to be exposed on both sides of the cutting board, the board is usable as a two-sided cutting board. Alternatively, two sets of magnets may be installed; one set on each side.

Referring to FIG. 9, FIG. 9 illustrates a larger fill-size baseboard with magnets for attachment of the cutting board, whereas FIG. 1 and its derivatives show an X configuration The variations in attachment shown in FIGS. 1-8 are usable and applicable to the other shaped base forms like those of FIG. 9.

Cut out 10 here is shown as arcuate, but any shape will work as long as it admits a food receiving plate under the cutting board itself The boards may be heavy so as many magnets 8 as needed to hold them securely are installed. The six shown are illustrative. Note that they are in a pattern symmetrical about more than one axis. This permits the boards to be attached in at least two positions. Furthermore, when the board is elongated as shown in FIG. 9, the central magnets are arranged along the longer axis of the board instead of along the shorter axis. It has been found that when central magnets are placed on the shorter axis, they tend to "snag" as the boards are brought together or separated with a sliding motion from the side, which is a common, natural movement.

The magnetic boards are most easily separated by sliding them apart, however, they may be pulled apart "flat-way". This takes considerable force to initiate separation, but is practical.

The initial "flat-ways" separation can also be accomplished without pulling by using a lever means to initially force the magnets apart. A property of magnets is that the attraction force is greatest when they are very close together or touching, and the force diminishes rapidly with separation. Therefore, a lever device need only separate the plates a few hundredths of an inch to release the firm grip. This movement is easily accomplished with a small lever of the first class or a simple rotating lever system.

Alternative Designs

FIGS. 1 & 2 illustrate a square X shaped base with 4 arms extending to the corners, or alternatively to the sides of the attachable cutting board. The system will work with 3, 4, 5, 6, or more arms. Although 3 arms has less stability than 4 or more, and more than 4 sacrifices some cut-out space 10 required for the receiving plate to be placed under the cutting board. The arm system shown will also work for non-square patterns, such as rectangular, oval, and novelty shapes. The limit for adding arms obviously is a solid base. FIG. 9 is typical of a solid base.

How to Use the Invention

The cutting board and base are brought together with the holding means in cooperative alignment and the cutting surface used conventionally. When finished cutting, a plate or tray is passed into the cut-out under the cutting board and the cut up food is swept off the board into the plate. The base and cutting board are then separated by pulling apart and the cutting board is cleaned and sterilized in the usual manner.

I claim:

1. A kitchen cutting board comprising in combination:
   a. a plate having an upper planar surface for cutting food thereon and a base adapted to receive said plate, and
   b. said base further comprising a central core portion having at least three attached arms arrayed radially around said central core portion, and each arm further comprising a friction providing foot on the underside and a mounting means on the upper side for removably securing the plate to the upper side of the base, and
   c. wherein said cutting plate is adapted to cooperate with said mounting means whereby said cutting plate is removably attached to said base, and
   d. said base having at least one cove between adjacent radial arms, wherein said cove receives a portion of a dish therein for receiving cut food from the cutting surface.

2. The kitchen cutting board of claim 1 further comprising: said mounting means is a plurality of magnets, wherein each radial arm has at least one magnet set into the arm upper side near the distal end of said radial arm, and said plate has magnets set into the under side of said plate, wherein said magnets are placed to cooperate with the magnets in the radial arms, thereby providing removable attachment of said base and plate by means of magnetic attraction.

3. The kitchen cutting board of claim 1 further comprising: said mounting means is an upwardly projecting fence at the distal end of each said radial arm, wherein said fences form stops within which said plate is restrained from lateral movement over the base.

4. The kitchen cutting board of claim 1 wherein: said mounting means is a plurality of pins and receiving holes, wherein said pins project upwardly from near the distal ends of said radial arms, and cooperating holes in the underside of said plate, whereby when said pins and holes are engaged, said plate is restrained from lateral movement over the base.

5. The kitchen cutting board of claim 1 wherein: said mounting means is a plurality of pins and a receiving groove, wherein said pins project upwardly from near the distal ends of said radial arms, and cooperating groove in the underside of said plate, whereby when said pins and groove are engaged, said plate is restrained from lateral movement over the base.

6. A kitchen cutting board comprising in combination:
   a. a base adapted to receive a plate having an upper planar surface for cutting food thereon, and
   b. said base further comprising a plurality of arms arrayed radially around a central core, and
   each arm further comprising a friction providing foot on the underside and a magnet on the upper side, and
   c. said cutting plate having a lower surface comprising a plurality of magnets aligned to cooperate with the magnets in the base whereby said plate is removably attached to said base by magnetic attraction, and
   d. said base having coves between each said radial arm, whereby said coves receive a portion of a dish therein.

7. A kitchen cutting board assembly comprising in combination:
   a. a base adapted to receive a plate having an upper planar surface for cutting food thereon, and
   b. said base further comprising a central core portion having at least three attached arms arrayed radially around said central core portion, each arm further comprising a friction providing foot on the underside, and a plate mounting means on the upper side co-operating with a holding means on said plate for removably securing the plate to the base, and
   c. where said mounting means is selected from the group consisting of an upwardly projecting fence at the distal end of each radial arm and co-operating edges of said plate; and an upwardly projecting pin near the distal end of said each radial arm and co-operating recesses in said plate; and
   d. whereby said mounting means on the base and co-operating holding means on the plate provide mechanical restraint to prevent lateral movement of the plate upon the base,
   e. said base having at least one cove between adjacent radial arms, wherein said cove receives a portion of a dish therein for receiving cut food from the cutting surface.

8. The cutting board assembly of claim 7 where said plate recesses are holes on the underside of said plate for receiving said pins near the distal edges of the arms.

9. The cutting board assembly of claim 7 where said plate recess is a circular groove on the underside of said plate for receiving said pins near the distal edges of the arms.

* * * * *